United States Patent [19]
Kondo

[11] Patent Number: 5,534,931
[45] Date of Patent: Jul. 9, 1996

[54] ENCODING METHOD AND APPARATUS OF DIGITAL VIDEO SIGNAL

[75] Inventor: Tetsujiro Kondo, Kanagawa, Japan

[73] Assignee: Sony Corporation, Tokyo, Japan

[21] Appl. No.: 226,848

[22] Filed: Apr. 13, 1994

[30] Foreign Application Priority Data

Apr. 16, 1993 [JP] Japan .................... 5-114140

[51] Int. Cl.⁶ .............. H04N 5/76; H04N 7/12; H04N 11/02; H04N 11/04
[52] U.S. Cl. .............. 348/420; 358/335; 360/9.1
[58] Field of Search .................... 348/420, 699, 348/421; 358/335; 360/9.1; H04N 7/12, 7/13, 7/133, 9/64

[56] References Cited

U.S. PATENT DOCUMENTS

| | | | |
|---|---|---|---|
| 4,947,249 | 8/1990 | Kondo | 358/135 |
| 5,068,722 | 11/1991 | Sugiyama . | |
| 5,091,782 | 2/1992 | Krause et al. | 358/135 |
| 5,206,723 | 4/1993 | Parke | 358/105 |
| 5,428,395 | 6/1995 | Jeong | 348/412 |

FOREIGN PATENT DOCUMENTS

| | | |
|---|---|---|
| 0014045 | 8/1980 | European Pat. Off. . |
| 0316184 | 5/1989 | European Pat. Off. . |
| 0373924 | 6/1990 | European Pat. Off. . |

OTHER PUBLICATIONS

Patent Abstracts Of Japan, vol. 7, No. 23 (P-171) 29 Jan. 1983, JP-A-57 176 577 (Sony Kabushiki Kaisha) 29 Oct. 1982.
Patent Abstracts of Japan, vol. 15, No. 148 (E-1056) 14 April 1991, JP-A-03 024 887 (Sony Corporation).

*Primary Examiner*—Thai Q. Tran
*Assistant Examiner*—Y. Lee
*Attorney, Agent, or Firm*—William S. Frommer; Alvin Sinderbrand

[57] ABSTRACT

A block segmenting circuit block segments a digital video signal. A block encoding circuit encodes the block segmented data. A head H records the encoded data on a tape. A block segmenting circuit varies the start address of each block and detects an error between the original data and the decoded data at each start address. A cumulating circuit camulates the errors for a predetermined time period. A detecting circuit detects the minimum value of the cumulated values. Thus, a block start address with the lowest error is determined. With a block construction defined by the start address, a block segmenting circuit perform block segmentation.

6 Claims, 5 Drawing Sheets

Fig. 2
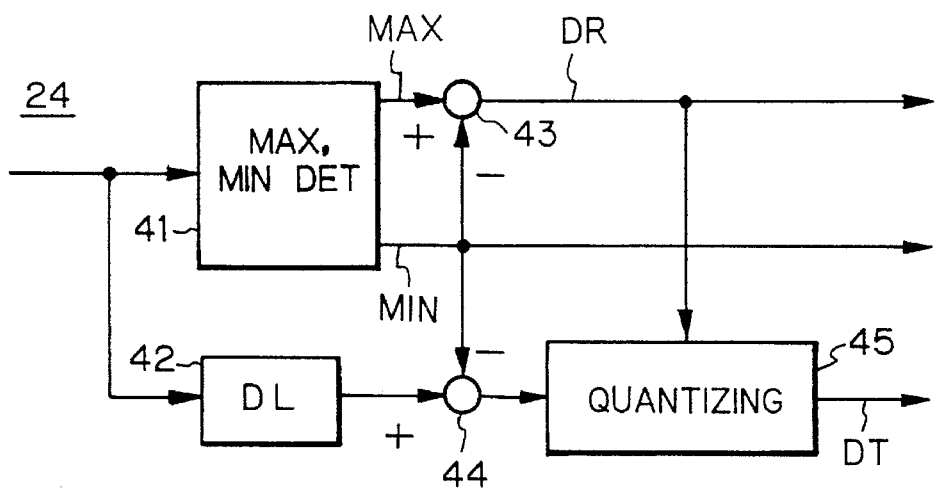
Fig. 3
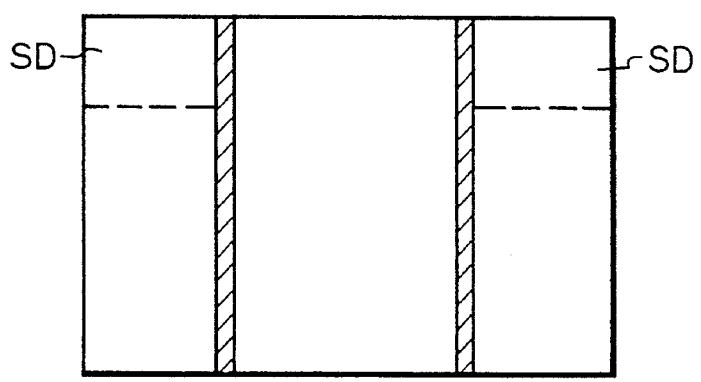
Fig. 4

ENCODING METHOD AND APPARATUS OF DIGITAL VIDEO SIGNAL

BACKGROUND OF THE INVENTION

1. Field of the Invention

The present invention relates to an encoding method and apparatus for block segmenting a digital video signal, in particular, to an encoding method and apparatus suitable for a digital VTR.

2. Description of the Prior Art

Digital VTRs that record digital video signals on magnetic tapes with rotating heads are known. A digital VTR encodes an input video signal so as to compress the data amount thereof. For example, as a prior art reference, a block encoding technique where a video signal is formed of two-dimensional blocks and encoded block by block is known. The applicant of the present invention has proposed an ADRC (Adaptive Dynamic Range Coding) system. In the ADRC system, video data is converted into block-structured data. Each pixel data of each block is quantized with a quantizing step width corresponding to a dynamic range of the block. This system is disclosed as U.S. Pat. No. 4,703,352.

In analog VTRs, it is known that even if dubbing is repeated (multiple debugging is performed), the quality of a dubbed image is deteriorated. However, in digital VTRs, even if the multiple dubbing is repeated, the image quality is not deteriorated. To accomplish the multiple dubbing without deterioration of the image quality in the digital VTRs, when block codes are repeatedly encoded and decoded, the boundary of each block should not be moved. However, as will be described, it was difficult to satisfy such conditions.

FIG. 5 is a block diagram schematically showing an example of a dubbing system. In the drawing, reference numerals 1A and 1B are digital VTRs. The digital VTR 1A has an analog video input terminal 1Aa, a digital video input terminal 1Da, an analog video output terminal OAa, and a digital video output terminal ODa. Likewise, the digital VTR 1B has input terminals 1ab and 1Db and output terminals OAb and ODb.

An A/D converter 2 is disposed between the input terminal 1Aa and a record processing circuit 3. The A/D converter 2 converts an input analog video signal into a digital video signal of for example 8 bits/sample. The output signal of the A/D converter 2 is supplied to the record processing circuit 3. The record processing circuit 3 performs various predetermined processes such as block segmenting process, block encoding process, error correction code encoding process, frame segmenting process, and channel modulating process. The record processing circuit 3 outputs record data. The record data is supplied to a head H. The head H records the record data on a magnetic tape T. Normally, the head H is constructed of a plurality of rotating heads. With the rotating heads, record data of each frame is recorded on corresponding tracks of the magnetic tape T.

Reproduction data retrieved from the magnetic tape T through the head H is supplied to a reproduction processing circuit 4. The reproduction processing circuit performs various predetermined processes such as channel demodulating process, frame desegmenting process, error correction code decoding process, block code decoding process, and block desegmenting process. The reproduction video data is supplied to the digital output terminal ODa. In addition, the reproduction video data is supplied to a D/A converter 5. The D/A converter 5 outputs an analog reproduction video signal. The analog reproduction video signal is supplied to the output terminal OAa. The digital VTR 1A also has a timing control circuit 6 that controls timing of the recording process and reproducing process. The timing control circuit 6 generates for example a clock CK1 for use with the A/D converter 2.

As with the VTR 1A, the other digital VTR 1B has an A/D converter 12, a record processing circuit 13, a head H, a reproduction processing circuit 14, a D/A converter 15, and a timing control circuit 16. The timing control circuit 16 generates a clock CK2 for use with the A/D converter 12.

With reference to FIG. 5, an analog video unit 10 is disposed between the digital VTRs 1A and 1B. The analog video unit 10 processes an analog video signal. The analog video unit 10 processes a reproduction analog video signal of the digital VTR 1A. The digital VTR 1B records the output signal of the analog video unit 10. In this system, the A/D converter 2 of the digital VTR 1A should digitize an analog video signal. In addition, the A/D converter 12 of the digital VTR 1B should digitize the analog video signal.

Generally, the digital VTRs 1A and 1B asynchronously operate with each other. In the A/D converting processes of these VTRs 1A and 1B, the phase of the sampling clock CK1 does not accord with the phase of the sampling clock CK2. FIG. 6 shows the difference of phases of the sampling clocks CK1 and CK2. For the block encoding process in the record processing circuit 3, n x m blocks BL1, BL2, BL3, . . . , and so forth are formed (where m=4 in FIG. 6). The analog video unit 10 supplies a video signal Sv to the digital VTR 1B. The value of each pixel is encoded with one bit by block encoding process such as ADRC process. Each block of the video signal Sv where one-bit data is decoded has two values that range from 0 to 255. For example, for block BL1, values 50 and 70 are decoded. For block BL2, values 120 and 140 are decoded.

When the digital VTR 1B records the video signal Sv, since the phase of the clock CK1 does not accord with the phase of the clock CK2, the block segmentation performed in the digital VTR 1A differs from the block segmentation performed in the digital VTR 1B. In FIG. 6, when the A/D conversion is performed with the clock CK2 represented by dotted lines, due to the phase difference of the clocks, adjacent block data (with a value 120) is contained in data of block BL1. In other words, pixels of the block BL1 have values 50, 70, 50, 120, . . . and so forth.

Thus, when the ADRC decoding process is performed in the digital VTR 2 so as to perform edge matching for one bit (namely, decoded values of the maximum value and minimum value of the block take place), the decoded values of the pixels of the block BL1 are 50, 50, 50, and 120. Thus, a distortion where the second decoded value is changed from 70 to 50 takes place. In other words, the phase difference of the clocks causes one pixel to be shifted. Consequently, the block construction of the digital VTR 1A differs from that of the digital VTR 1B, thereby degrading the image quality.

When a time axis deviation takes place in the analog video unit 10 shown in FIG. 5, a plurality of pixels instead of one pixel may be shifted at each block boundary. In the digital VTR, while the horizontal synchronous signal and the vertical synchronous signal contained in the video signal are not recorded, the reproduction signal is D/A converted. After the reproduction signal has been D/A converted, such synchronous signals are added to the analog signal. Since the reproduction data Contains a time-axis-fluctuating component, which is referred to as a jitter, the relative positions between the synchronous signals and the data may vary. Thus, several pixels may be shifted.

Thus, as shown in FIG. 5, in the dubbing system that temporarily converts a digital video signal into an analog video signal, each block boundary is shifted for one to several pixels, thereby deteriorating the image quality.

Likewise, such a problem takes place when a digital video signal is not converted into an analog video signal (namely, the dubbing is performed with a digital signal). FIG. 7 shows a system constructed of digital VTRs 1A, 1B, and 1C and an edit processing unit 11. The edit processing unit 11 combines a digital video signal SA that is supplied from a digital output terminal ODa of the digital VTR 1A with a part of a digital video signal SB that is supplied from an output terminal ODb of the digital VTR 1B. The edit processing unit 11 outputs a digital video signal SC. The digital video signal SC is supplied to a digital input terminal IDc of the digital VTR 1C. The digital VTR 1C performs a recording process for the combined digital video signal SC and then records the signal on a tape.

FIGS. 8A, 8B, and 8C show some examples of the combining process performed by the edit processing unit 11. In FIGS. 8A, 8B, and 8C, portions represented by dotted lines are extracted from the digital video signal SA. The extracted portions are positioned in the digital video signals. In any process shown in FIGS. 8A, 8B, and 8C, the boundary of an image being extracted do not always accord with the boundary of a block. In other words, in most cases, they do not match each other. The edit processing unit 11 extracts image portion from an editing point of view rather than considering blocks for block encoding process.

FIG. 9 shows a block construction that changes in the editing process shown in FIG. 8A. When a portion represented by a dotted line is extracted from the digital video signal SA, portions of blocks B1, B2, Bn, and Bn+1 that are disposed at the upper left corner of the digital image signal SA are contained in a new block B1' (represented by a dotted line) as shown in FIG. 10A.

FIG. 10A is an example of a block that is constructed of 4×4 pixels. This block contains data of original blocks B1, B2, Bn, and Bn+1, each of which is constructed of 2×2 pixels. A numeral of each pixel position represents the value thereof. The digital VTR 1C connected to the edit processing unit 11 encodes a new block with one-bit ADRC process. In other words, the maximum value of the new block is 150, whereas the minimum value of the new block is 40. Thus, as shown in FIG. 10B, with a threshold value of 95, encoded data 1 and 0 are formed.

When data that has been encoded in such a way and recorded on a tape is decoded by edge matching technique, encoded data "1" and "0" are treated as values "150" and "40", respectively. FIG. 10C shows decoded values of the block B1'. As is clear from FIGS. 10A and 10B, the decoded values remarkably vary and a distortion takes place.

As described above, since the phase difference takes place in the A/D conversion or the boundary of an image extracted does not accord with the boundary of a block, when dubbing is performed, the image is deteriorated. Due to the phase difference in the A/D conversion, the beginning edge of a block is horizontally shifted. On the other hand, due to the disaccordance of the boundary of the extracted image and the boundary of the block, the beginning edge may be shifted horizontally and vertically.

When the beginning edge of a block of a reproducing VTR accords with the beginning edge of a block of a recording VTR, if other noises are ignored, no image deterioration takes place. Even if other noises such as quantizing noise and surrounding noise are considered, the image deterioration in the case of the accordance of the beginning edge of a block is lesser than that in the case of the disaccordance thereof.

OBJECTS AND SUMMARY OF THE INVENTION

Therefore, an object of the present invention is to provide an encoding apparatus of a digital video signal, for preventing deterioration of image quality caused by shifting of the beginning edge of a block.

According to an aspect of the present invention, there is provided an encoding apparatus of a digital video signal, comprising a block segmenting circuit for converting a scanning-sequence digital video signal into a block-structured signal, a block encoding circuit for compressing and encoding the output of the block segmenting circuit, block by block, a local decoding circuit for decoding the output of the block encoding circuit, a comparing circuit for comparing the output of the local decoding circuit with the output of the block segmenting circuit, a varying circuit for varying a block start address of the block segmenting circuit, and a detecting circuit for cumulating the output of the comparing circuit when the block start address is varied by the varying circuit so as to detect a start address with the minimum cumulated value, wherein the input video signal is block segmented with the start address, which is the output of the detecting circuit.

An input video signal is block-segmented and locally decoded. A block start address corresponding to the beginning of a block is varied at a suitable position. At each start address, a decoded value is formed. An error between an original signal and a locally decoded value is cumulated at a predetermined time period. It is presumed that a block start address with the minimum value is a correct beginning edge of the block. Thus, the image deterioration caused by the difference of the block construction can be prevented.

The above, and other, objects, features and advantage of the present invention will become readily apparent from the following detailed description thereof which is to be read in connection with the accompanying drawings.

BRIEF DESCRIPTION OF THE DRAWINGS

FIG. 2 is a block diagram showing an example of a block encoding circuit according to the present invention;

FIG. 3 is a schematic diagram for explaining a block start address;

FIG. 4 is a schematic diagram for explaining a process of the embodiment of the present invention;

DETAILED DESCRIPTION OF THE PREFERRED EMBODIMENTS

Figure 1:
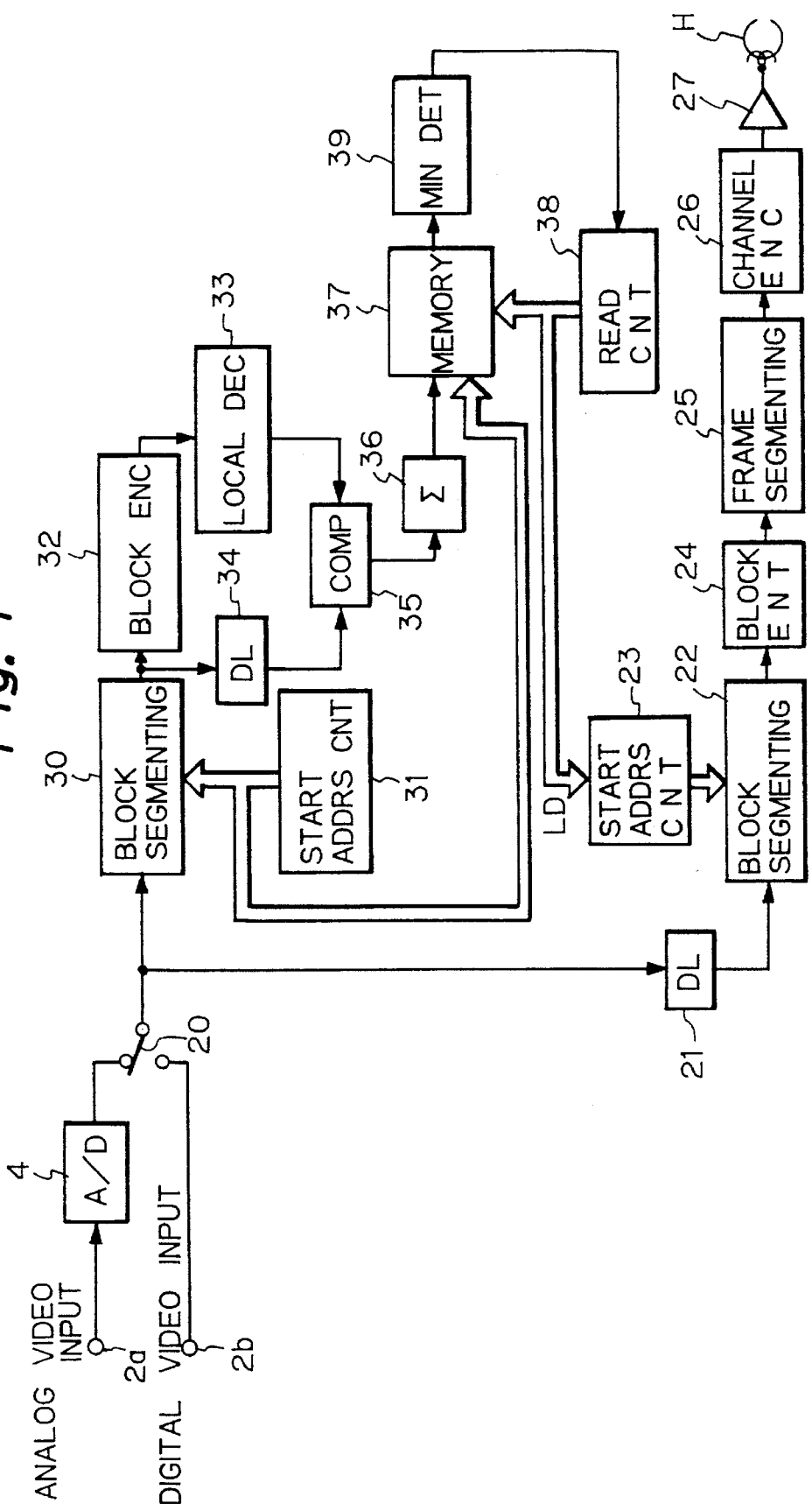
FIG. 1 is a block diagram according to an embodiment of the present invention.
Figure 5:
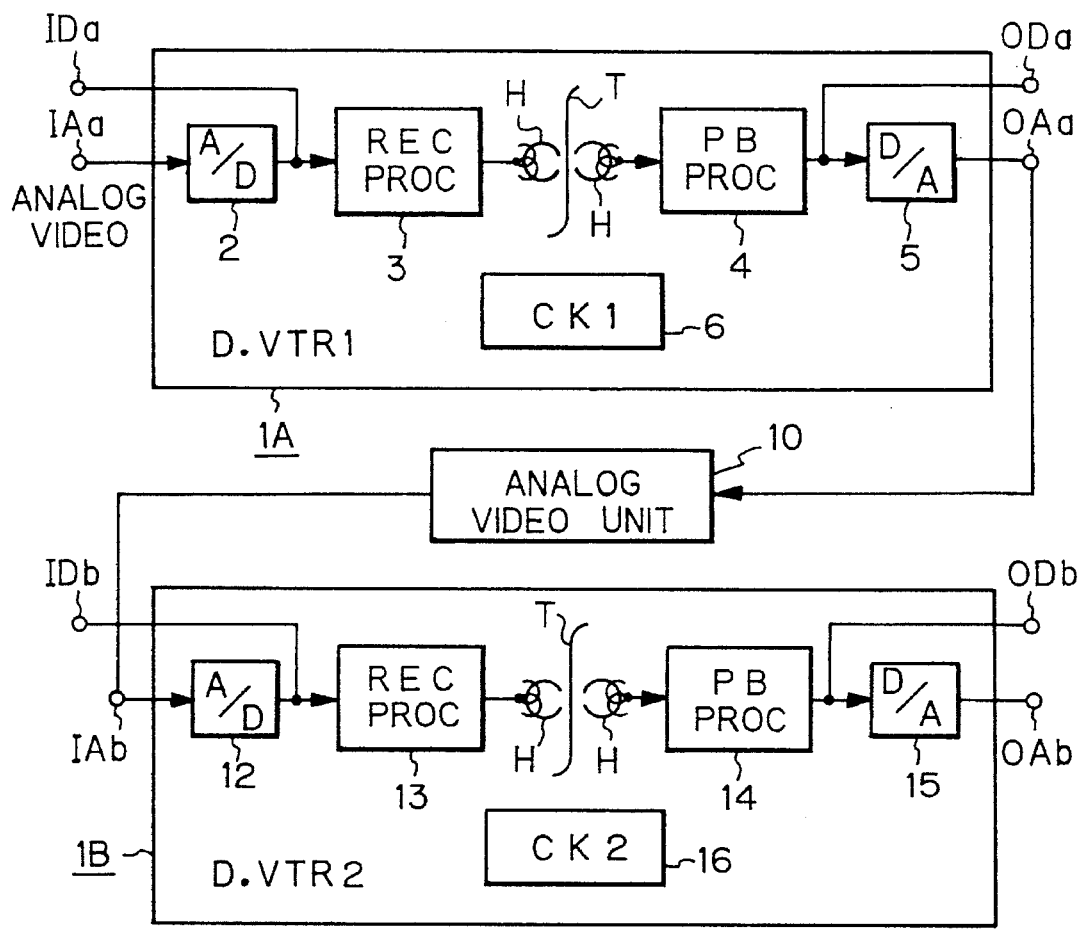
FIG. 5 is a block diagram showing an example of a dubbing system.
Figure 6:
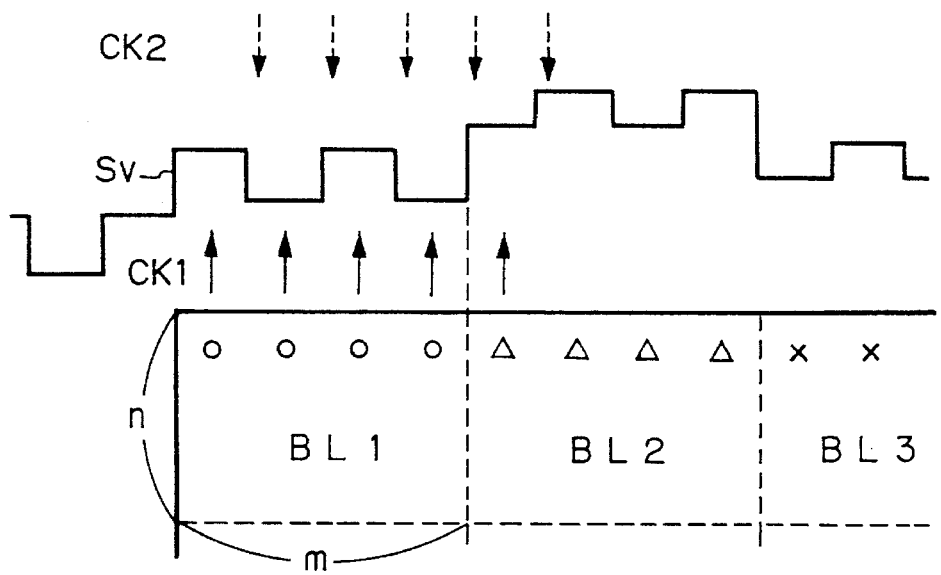
FIG. 6 is a schematic diagram for explaining a problem that takes place in dubbing.
Figure 7:
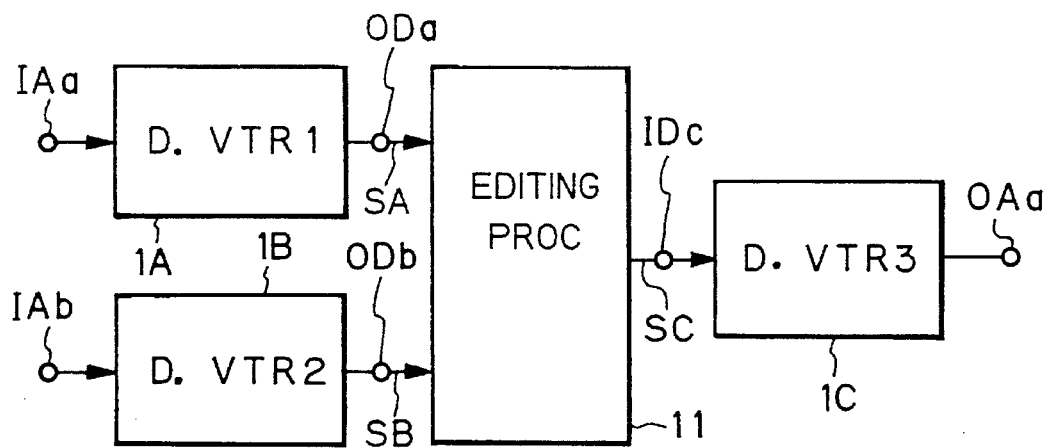
FIG. 7 is a block diagram showing another example of a dubbing system.

Next, with reference to the accompanying drawings, an embodiment of the present invention will be described. FIG. 1 is a block diagram showing a digital VTR according to an embodiment of the present invention. In FIG. 1, the digital VTR is used as a recording VTR in a dubbing system. An input digital video signal is supplied to a block segmenting circuit 22 through a selector 20 and a delaying circuit 21. Alternatively, a digital video signal supplied from an A/D converter 4 is supplied to the block segmenting circuit 22 through selector 20 and delaying circuit 21. The delaying circuit 21 delays a recording process for a time period necessary for determining a block start address (that will be described later).

The block segmenting circuit 22 converts a scanning-sequence input digital video signal into a two-dimensional block structured signal where each block is constructed of 4×4 pixels. In association with the block segmenting circuit 22, a start address count 23 that controls the start address of each block is provided by start address counter 23. The output data of the block segmenting circuit 22 is supplied to a block encoding circuit 24. The block encoding circuit 24 may be an ADRC encoding circuit, which will be described later. The block encoding circuit 24 compresses the data received from the block segmenting circuit 22. The compressed data is supplied to a frame segmenting circuit 25. The frame segmenting circuit 25 forms record data from the output data of the block encoding circuit 24. The frame segmenting circuit 25 encodes an error correction code for the encoded output of the block encoding circuit 24.

The output data of the frame segmenting circuit 25 is supplied to a channel encoding circuit 26. The channel encoding circuit 26 performs a channel modulation that reduces a DC component of the record data. The output data of the channel encoding circuit 26 is supplied to a head H through a recording amplifier 27. The head H records the output data of the recording amplifier 27 on a magnetic tape (not shown). Normally, the head H is constructed of a plurality of rotating heads.

FIG. 2 shows an ADRC encoding circuit, which can be used as the block encoding circuit 24. A digital video signal received from the block segmenting circuit 22 is supplied to a MAX and MIN detecting circuit 41 and a delaying circuit 42. The MAX and MIN detecting circuit 41 detects a maximum value MAX and a minimum value MIN of each block. The delaying circuit 42 delays data until the maximum value MAX and the minimum value MIN are detected. A subtracting circuit 43 subtracts MIN from MAX and outputs a dynamic range DR. The dynamic range DR is supplied to a quantizing circuit 45. The quantizing circuit 45 performs quantization corresponding to the dynamic range DR.

A subtracting circuit 44 subtracts the minimum value MIN from the video data received from the delaying circuit 42. Thus, the subtracting circuit 44 outputs normalized video data which does not contain the minimum value MIN. The normalized video data is supplied to a quantizing circuit 45. When the number of bits of encoded data is n, a quantizing step width of $DR/2^n = \Delta$ is formed. The normalized video data is divided by the quantizing step $\Delta$. The quotient of the division is rounded off and the resultant integer is treated as a code signal DT. The quantizing circuit 45 is constructed of a dividing circuit or a ROM.

Returning to FIG. 1, an input digital video signal is supplied to a block segmenting circuit 30. The block segmenting circuit 30 is connected to a block encoding circuit 32. The constructions of the block segmenting circuit 30 and the block encoding circuit 32 are the same as those of the block segmenting circuit 22 and the block encoding circuit 24, which perform the recording process. In association with the block segmenting circuit 30, a start address counter 31 is provided.

For each block constructed of 4×4 (=16) pixels, 16 start addresses 1 to 16 are defined as shown in FIG. 3. The size of each block is fixed. The beginning edge of each block, that is the pixel position at the upper left corner of each block, is varied depending on the start address. The start address counter 31 increments the start address from 1 to 16.

The encoded output of the block segmenting circuit 32 is supplied to a local decoder 33. The local decoder 33 locally decodes the data received from the block encoding circuit 32. The decoded output of the local decoder 33 and the original data supplied through the delaying circuit 34 are supplied to a comparing circuit 35. The comparing circuit 35 detects the difference (namely, error) between the value of the original data and the value of the decoded data. The error is supplied to a cumulating circuit 36. The cumulating circuit 36 cumulates the output of the comparing circuit 35 in a predetermined time period. The cumulated result is supplied to a memory 37.

A write address of the memory 37 is the output of the start address counter 31. The cumulated values at the start addresses 1 to 16 are written to the memory 37. After a predetermined time period has elapsed, the cumulated values stored in the memory 37 are read with the output of a read address counter 38. The output of the memory 37 is supplied to a minimum value detecting circuit 39. The detecting circuit 39 detects the minimum value of the cumulated values at the start addresses 1 to 16. The detected value is supplied to the read address counter 38. The start address according to the minimum value detected is held.

The start address being held is loaded to the start address counter 23. Thus, the block segmenting circuit 22 supplies data of 4×4 pixels starting from a start address with the minimum decoding error to the block encoding circuit 24. Thus, the recording VTR shown in FIG. 1 performs block segmentation at the same block boundary as the reproducing digital VTR does, thereby minimizing the deterioration of image quality.

The predetermined time period necessary for cumulating the error received from the comparing circuit 35 may be a time period of first several blocks of each field, so as to prevent block shifting caused by phase difference of clocks. For countermeasures against block shifting in horizontal and vertical directions in the process for positioning an extracted partial image, the error should be cumulated at each field interval.

Figure 8A:
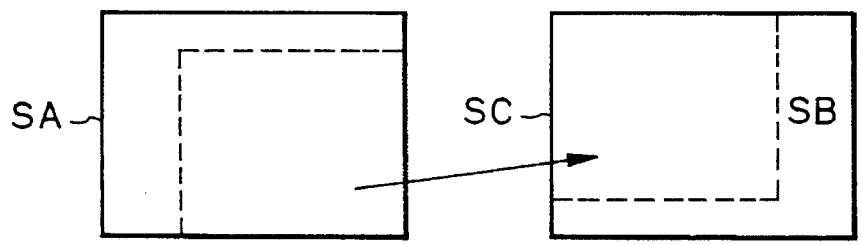
FIG. 8A, 8B and 8C are schematic diagrams showing examples of an editing process in dubbing.
Figure 8B:
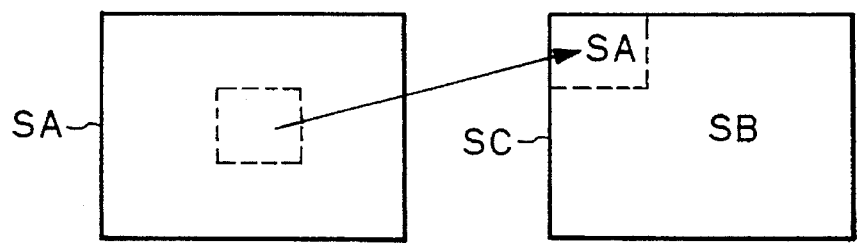

In the process for positioning an extracted partial image, the quality of one of two images may be deteriorated. Next, the countermeasures against this problem will be described. As shown in FIG. 8A, when a combining process is performed, if an SA area is larger than an SB area, the block segmentation is performed corresponding to the block construction of the SA area at the sacrifice of the deterioration of image quality of the SB area. When the SB area is larger than the SA area as shown in FIG. 8B, the block segmentation is performed corresponding to the block construction of the SB area. In other words, with editing information received from the edit processing unit or the like, the minimum value for only a larger area is detected.

Figure 8C:
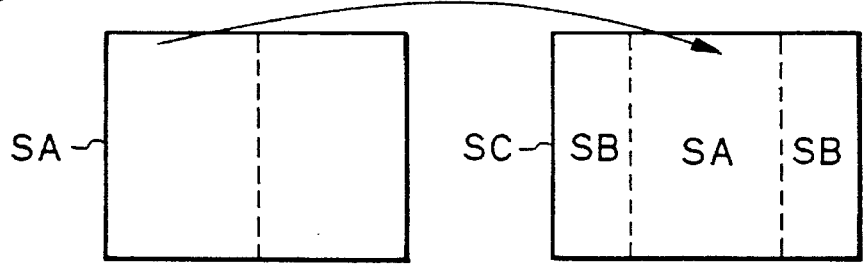
Figure 9:
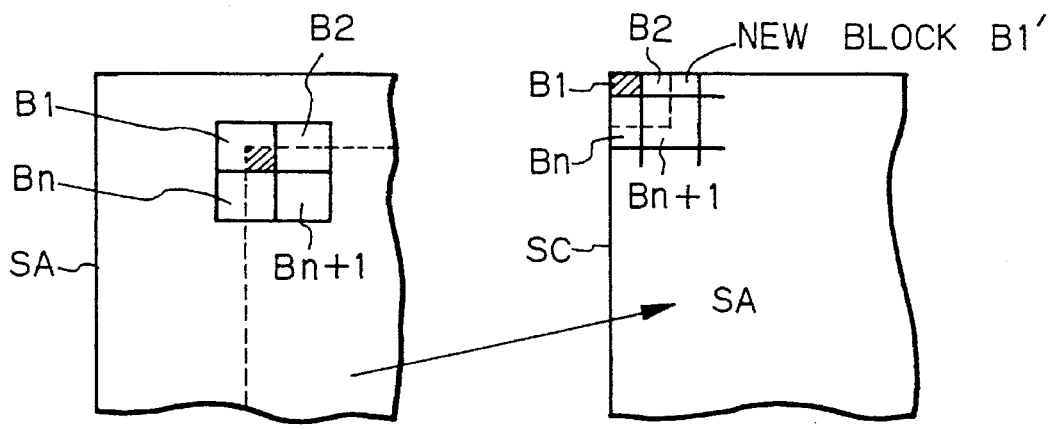
FIG. 9 is a schematic diagram for explaining a problem in dubbing with an editing process.
Figure 10A:
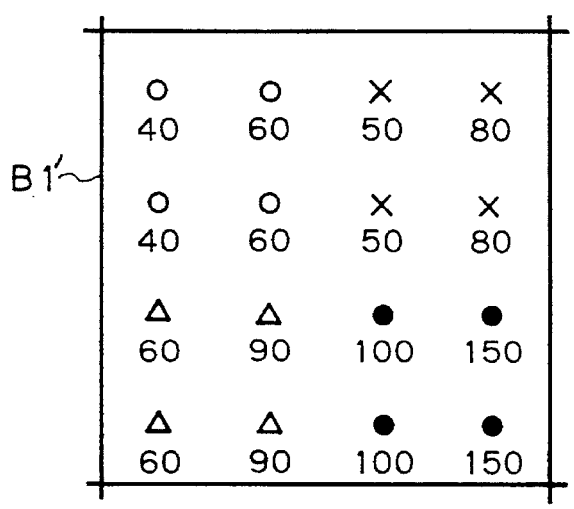
FIG. 10A, 10B and 10C are schematic diagrams for explaining a problem in dubbing with the editing process.
Figure 10B:
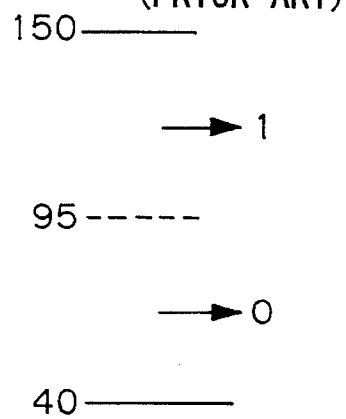
Figure 10C:
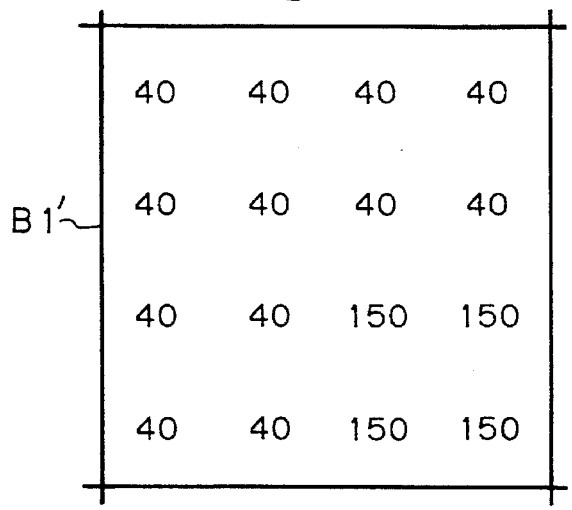

When the two SA and SB areas are nearly the same as shown in FIG. 8C, the start address is changed at a boundary of the areas. In other words, with the editing information or the like, the cummulation is performed for the SD area as shown in FIG. 4 and then reset. In the case of FIG. 8C, since the deterioration of image quality takes place at a hatched area shown in FIG. 4, the deterioration may be alleviated by a trimming process, a blanking process, or the like.

As an alternative method, the minimum value may be detected with the start address of each block as a parallel process so as to determine an optimum block start address. The block encoding process may be performed by DCT process, vector quantizing process, FFT process, ABTC process, or the like instead of the ADRC process.

The present invention can prevent a change of block construction caused by dubbing, thereby preventing image quality in multiple dubbing from deteriorating.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An encoding apparatus of a digital video signal, comprising:
   first block segmenting means for converting an input scanning-sequence digital video signal into a block-structured signal;
   first blocking encoding means for compressing and encoding the output of said first block segmenting means, block by block;
   local decoding means for decoding the output of said first block encoding means;
   comparing means for comparing the output of said local decoding means with the output of said first block segmenting means;
   varying means for varying a block start address of said first block segmenting means, the block start address corresponding to a beginning of a block;
   detecting means for cumulating the output of said comparing means for a predetermined time period when the block start address is varied by said varying means so as to detect the block start address with a minimum cumulated value;
   second block segmenting means for block segmenting the input scanning-sequence digital video signal from the beginning thereof corresponding to the block start address with the minimum cumulated value; and
   second block encoding means for compressing and encoding the output of said second block segmenting means.

2. The encoding apparatus as set forth in claim 1, wherein the predetermined time period, for which the output of said comparing means is cumulated, is a period of first several blocks of each field of the digital video signal.

3. The encoding apparatus as set forth in claim 1, wherein the predetermined time period, for which the output of said comparing means is cumulated, is a period of each field of the digital video signal.

4. The encoding apparatus as set forth in claim 1, wherein said first block encoding means is adapted to detect a dynamic range of the block and quantize pixel data thereof corresponding to the dynamic range.

5. An encoding method for a digital video signal, comprising the steps of:
   converting an input scanning-sequence digital video signal into a block-structured signal in a block segmenter;
   compressing and encoding the block-structured signal, block by block, to produce an encoded signal;
   local decoding the encoded signal to produce a decoded signal;
   comparing the decoded signal and the block-structured signal to determine differences therebetween;
   varying a block start address of said block segmenter, the block start address corresponding to a beginning of a block;
   cumulating the differences between the decoded signal and the block-structured signal as determined in the comparing step for a predetermined time period when the block start address is varied during said varying step so as to detect the block start address with a minimum cumulated value;
   block segmenting the input scanning-sequence digital video signal from the beginning thereof corresponding to the block start address with the minimum cumulated value to produce a second encoded signal; and
   compressing and encoding the second encoded signal.

6. An encoding apparatus of a digital video signal, comprising:
   first block segmenting means for converting an input scanning-sequence digital video signal into a block-structured signal;
   first block encoding means for compressing and encoding the output of said first block segmenting means, block by block;
   local decoding means for decoding the output of said first block encoding means;
   comparing means for detecting a difference between the output of said local decoding means and the output of said first block segmenting means;
   varying means coupled with said first block segmenting means for varying a block start address, the block start address corresponding to a beginning of a block;
   cumulating means for cumulating the differences with respect to the block start address so as to determine the block start address with a minimum cumulated difference;
   second block segmenting means for converting the input digital video signal into the block-structured signal corresponding to the block start address with the minimum cumulated difference;
   second block encoding means for block encoding an output of said second block segmenting means; and
   delaying means for delaying an input to the second block segmenting means so as to allow the block start address with the minimum cumulated difference to be determined.

\* \* \* \* \*